Dec. 23, 1969 MASATOSHI SHIMADA 3,486,119

RECEIVING SYSTEM OF A SELECTIVE CALLING SIGNAL AND A SUCCEEDING SPEECH SIGNAL

Filed Jan. 11, 1966 6 Sheets-Sheet 1

INVENTOR.
MASATOSHI SHIMADA

BY Kurt Kelman

AGENTS

INVENTOR.
MASATOSHI SHIMADA
BY Kurt Kelman
AGENTS

*INVENTOR.*
MASATOSHI SHIMADA
BY Kurt Kelman
AGENTS

INVENTOR.
MASATOSHI SHIMADA

BY Kurt Kelman
AGENTS

*INVENTOR.*
MASATOSHI SHIMADA
BY Kurt Kelman
AGENTS

INVENTOR.
MASATOSHI SHIMADA
BY
Kurt Kelman
AGENTS

United States Patent Office 3,486,119

Patented Dec. 23, 1969

3,486,119

RECEIVING SYSTEM OF A SELECTIVE CALLING SIGNAL AND A SUCCEEDING SPEECH SIGNAL

Masatoshi Shimada, 78, 2-chome, Todorokimachi, Tanagawa Setagayaku, Tokyo, Japan Filed Jan. 11, 1966, Ser. No. 519,982
Claims priority, application Japan, Feb. 8, 1965, 40/6,590; Apr. 17, 1965, 40/22,415
Int. Cl. H04b *1/06*
U.S. Cl. 325—466 11 Claims

ABSTRACT OF THE DISCLOSURE

A signal receiving device having a signal selective circuit, a memory circuit and a gate circuit wherewith said gate circuit is controlled by the memory circuit to pass through a speech signal for a given period after termination of a selective calling signal and moreover a reset circuit is adapted to control said gate circuit or said memory circuit.

This invention relates to receivers. More particularly, it relates to a receiver for a selective calling system.

In a radio communication system wherein the same frequency is employed for transmission and reception such as in a citizen band transceiver, if a signal selector is employed in the receiver which provides an output in response to the reception thereby of a chosen calling signal, such arrangement effectively functions as an ideal squelch system since random noise, undesired speech signals, and the like are completely eliminated in the reception. However, if many transceivers having selective calling systems are employed in the same area, crossings of calling signals occur.

Consequently, to avoid such calling signal crossings, it becomes necessary to employ high quality signal selectors or to increase the number of available calling channels. Such employment is undesirable since, of necessity, sufficiently high quality signal selectors for this purpose are both relatively large and complex and are also quite expensive.

In a selective receiving system, a signal selector is provided in the receiver's output circuit and is normally maintained therein in a standby state. Then, when a calling signal is received, it is normally necessary to place a changeover switch in its talk position to receive the transmitted speech signals. When a mis-call signal is received, the signal selector is unable to discriminate between a call intended for the receiver and other calls until the changeover switch is placed into the talk position to enable the reception of speech signals. It is readily apparent that the changeover switch operation can become quite troublesome where mis-call signals are frequently received, such operation being particularly disadvantageous at work or while driving an automobile. In such transceiver systems wherein the receiver may be called by a voice signal, it is possible to select the intended receiver from many receivers and to eliminate the possibility of a mis-call.

It is, accordingly, an important object of this invention to provide a receiver for a transceiver system wherein the crossing of calling signals is substantially eliminated.

It is another object to provide a receiver in accordance with the preceding object which is relatively simple, is of small size and is relatively inexpensive, such qualities being partly imparted to the receiver by the enabling of the reduction of the number of calling channels.

It is a further object to provide a receiver in accordance with the preceding objects wherein the troublesome manipulation of a changeover switch back and forth between its standby and its talk positions is substantially minimized or even eliminated.

It is still another object to provide a receiver in accordance with the preceding objects in which the advantages presented both by selective tone calling and by voice calling systems are retained and wherein the disadvantages presented by their use are substantially eliminated.

These objects and advantages are attained according to the invention by providing a receiver in a transceiver system to which, in an illustrative embodiment thereof, for example, a predetermined calling signal is first transmitted for a chosen duration such as about 0.5 to 1.0 second, for example, and then a speech signal designating the desired receiver is transmitted. In the receiver, there is provided a signal selector which is responsive to the aforesaid predetermined calling signal and a gate circuit connected in parallel arrangement to the output terminal of a signal receiving circuit. Consequently, the output of the signal selector may be employed as a control output. The latter output is provided as an input to a memory circuit which produces an output to control the gate circuit, the memory circuit being so arranged whereby it continues to produce its gate circuit control output for a chosen period after the cessation of the input signal thereto. The gate circuit is responsive to the control signal output of the memory circuit and is operative to transfer an output signal of the signal receiving circuit from its input to its output terminal, i.e., the gate circuit is actuated or enabled by the calling signal. Thus, the calling signal is passed through the gate circuit. From the gate circuit, the calling signal is suitably applied to a monitor device and is suitably rendered audible by a loud speaker coupled to the monitor device.

With the receiver in the condition as described in the immediately foregoing, if a succeeding calling speech signal is transmitted to the receiver, this speech signal is also heard because gate circuit is still maintained in its enabled or operative state by the output of the memory circuit.

As has been mentioned hereinabove, the speech signal is chosen to be consistent with the designation of the desired receiver, i.e., the name of the operator thereof, for example. Thus, with the arrangement according to the invention, there is enable the positive and certain calling of the desired receiver and there exists no possibility of a mis-call. In the receiver, all of the above mentioned operations are effected automatically without any need for any manual operations. Consequently, a receiver operator receiving a calling signal followed by a calling speech signal has to place the changeover switch in a talk or speech receiving position only when his name or other designation of the receiver is heard by him. This is to be contrasted with the well known selective calling systems wherein only the calling signal and not the calling speech signal is heard. Therefore, in such known systems, it is necessary to operate a changeover switch to check by conversation as to whether or not a mis-call has occurred.

In the system according to the invention, although, when the receiver is in the standby state, calling signals and calling speech signals may be audible at times, conversational sounds are not entirely heard through the monitor speaker since the predetermined calling signal has not been transmitted to the receiver. Consequently, the gate circuit will not be enabled and an output signal from the receiving circuit will not be supplied as an input to the monitor device.

The period of the calling and speech signals is about $\frac{1}{10}$ to $\frac{1}{20}$ of the communication period. Consequently, it is not bothersome while it is of sufficient duration.

As has been mentioned hereinabove, a feature of the invention is the employment of a memory circuit and a gate circuit to enable the hearing of a calling speech signal for a chosen period after the cessation of the calling signal. For this purpose, known memory and gate circuits may be utilized. The gate circuit effectively acts as a make and break switch on the transmission line with respect to the speech signal. The memory circuit operates to store the output signal from the signal selector and thereby provides a control signal input to the gate circuit for the period which is necessary to pass a speech signal therethrough. With this arrangement, there is achieved the producing of the speech signal after the cessation of the calling signal.

Another feature, according to the invention, is the employment of a reset circuit therein. Such reset circuit is employed to control a gate circuit which operates to restore the receiver to its original, i.e., standby, condition upon cessation of transmitted information. Accordingly, a signal selector for a single channel frequency may be used except in a case where excessive cross calling occurs. The significance of such arrangement is that the receiver may be designed to be of advantageously small size and inexpensive and it becomes quite practical and profitable to make a relatively small portable transceiver since it is not necessary to employ therein a multi-channel signal selector with a changeover switch.

From the foregoing, it can be readily appreciated that the invention differs from like known systems at least, in the following particulars, viz: in the receiver in the standby state, although calling and speeches signals may possibly be heard therein, no noise or speech sounds are heard through the speaker. Thus, it may be stated that an important achievement of this invention is the controlling of the transmission path of a speech signal so as to pass a speech signal immediately following a calling signal through the path for a chosen period after the cessation of the production of an output from a signal selector, the controlling of such transmission path itself ceasing after a given period following the cessation of transmission. Consequently, hearing of noise and cross talk signals due to the gate circuit's being operative for an unnecessary period after the cessation of calling, may be eliminated.

A further feature of the invention is the utilization of a holding signal for the control signal of the reset circuit.

Yet another feature of the invention is the employment of a carrier signal for the control signal of the reset circuit.

Generally speaking and in accordance with the invention, there is provided a receiver comprising means for receiving signals transmitted thereto, means in circuit with the receiving means for selecting a predetermined signal from the received signals, a memory circuit which produces an output in response to the application thereto of the selected predetermined signal, and gate circuit means in circuit with the receiving means and the memory circuit which is enabled in response to the application thereto of the memory circuit output to pass through the gate circuit means, signals received by the receiving means.

For a better understanding of the invention together with other and further objects thereof, reference is had to the following description taken in conjunction with the accompanying drawing and its scope will be pointed out in the appended claims.

In the drawing, FIG. 1 is a diagram of a typical waveform of a transmitted signal;

Figure 9:
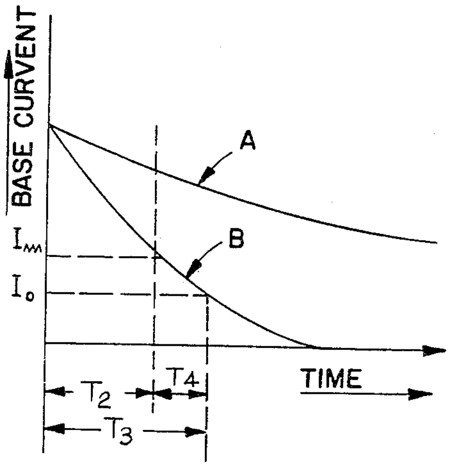
Figure 10:
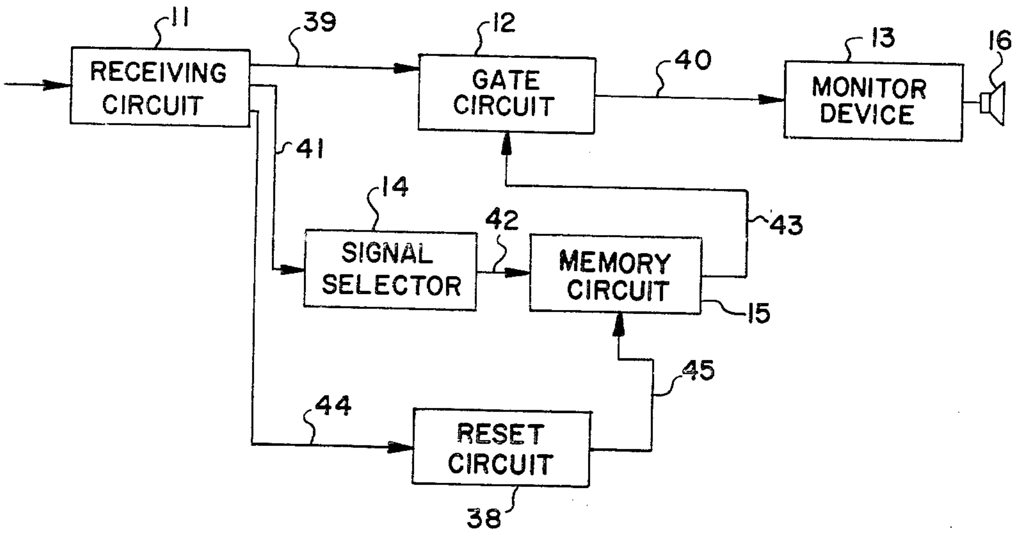
Figures 11, 12:
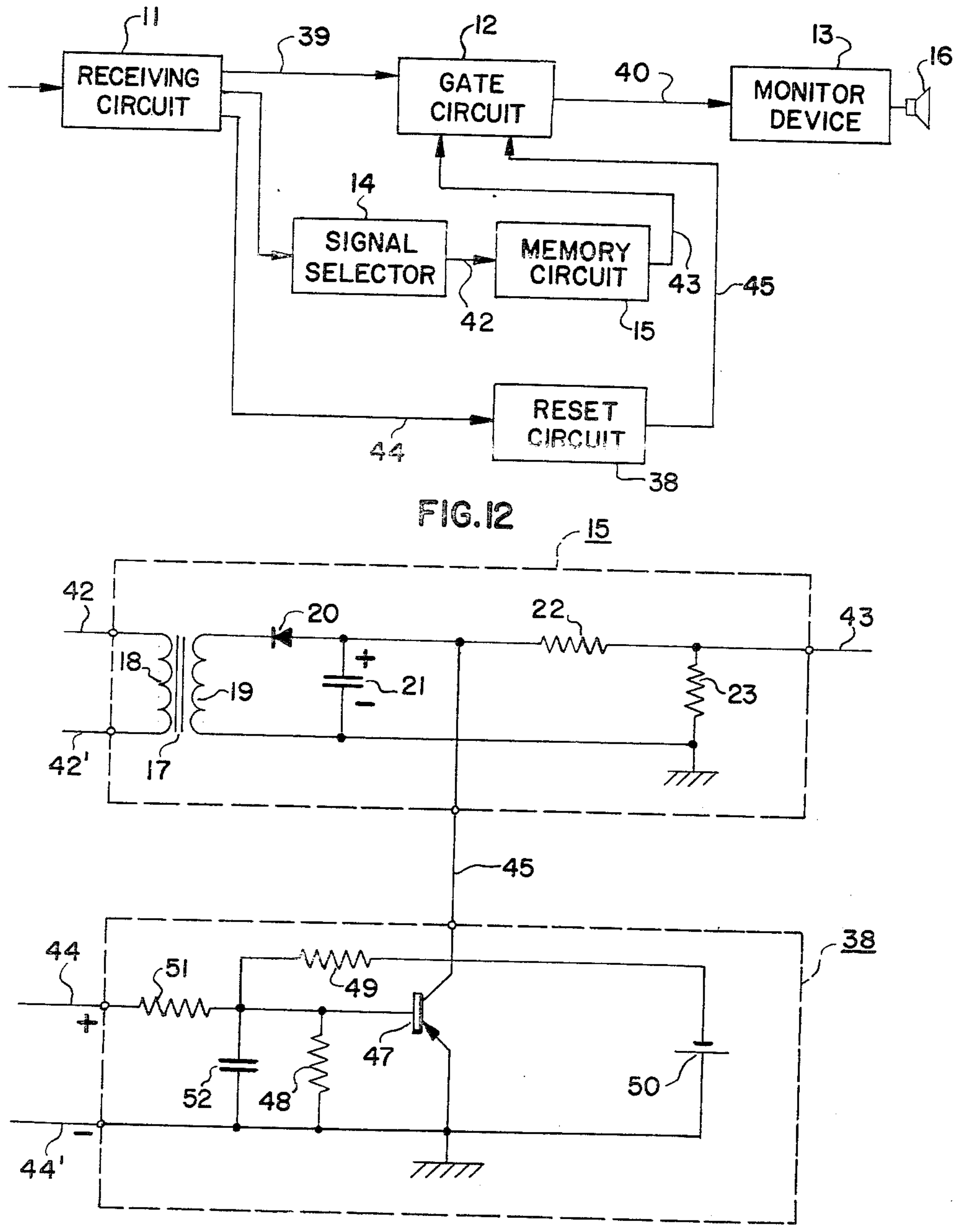
Figure 13:
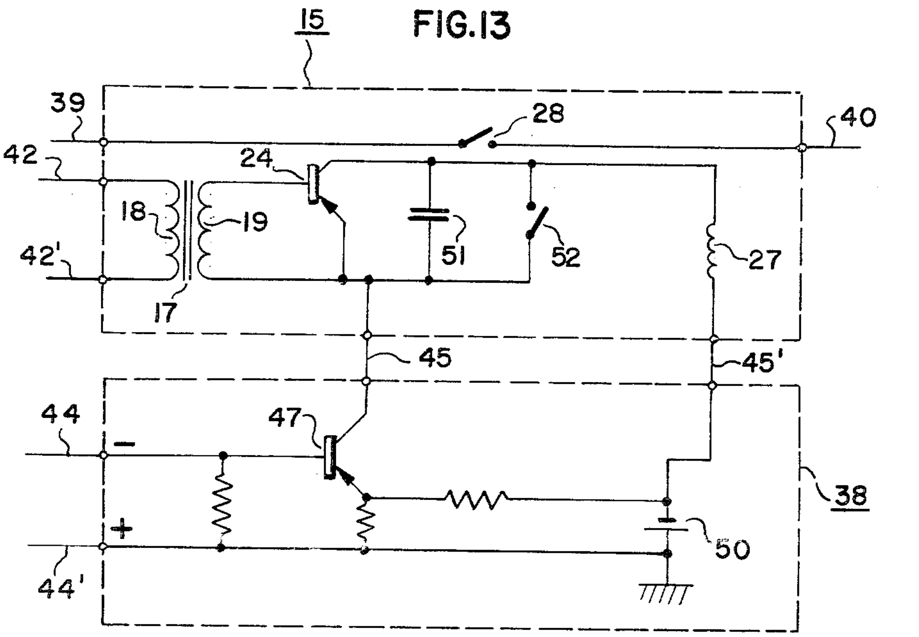
Figure 14:
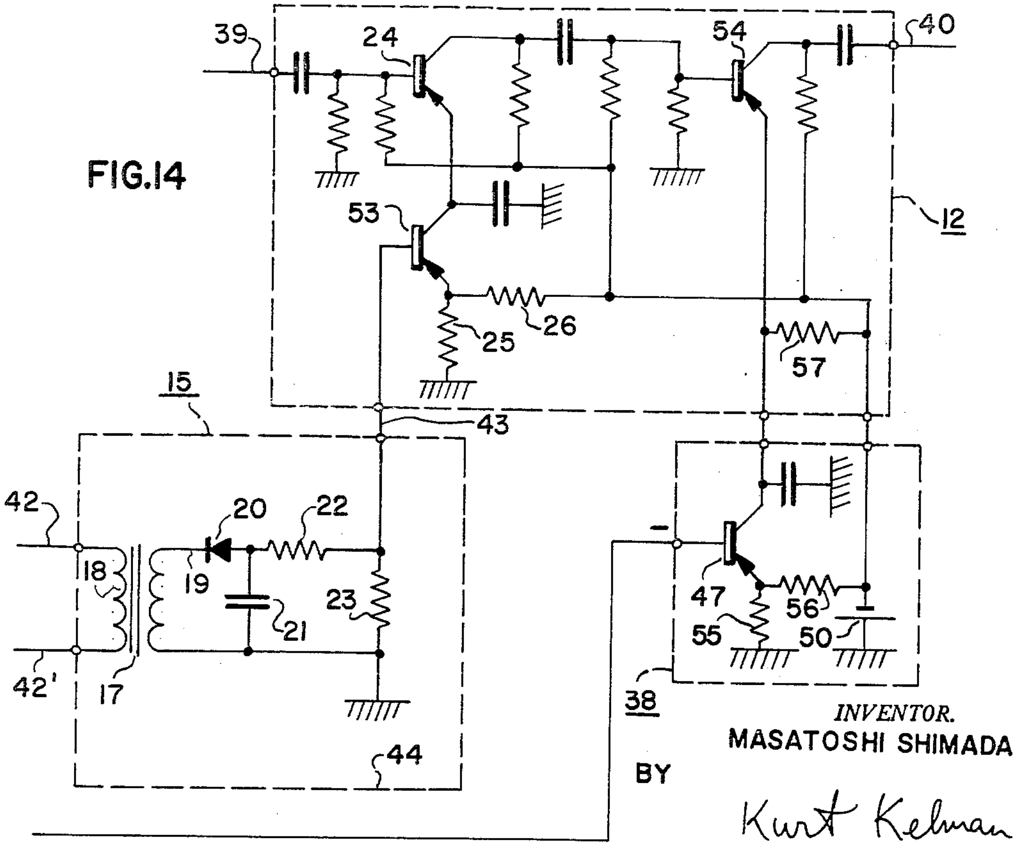

FIG. 9 comprises curves of the time dependence of the direct current control signal which obtains after the cessation of the calling signal;

FIG. 10 is a block diagram of an embodiment of a receiver constructed according to the invention wherein a carrier signal is employed as a holding signal;

FIG. 11 is a block diagram of a receiver similar to that shown in FIG. 10 with a modification thereof;

FIG. 12 is a schematic diagram of an embodiment of a memory and reset circuit;

FIG. 13 is a schematic diagram of an embodiment of a memory and reset circuit in which the memory circuit includes an electric relay; and FIG. 14 is a schematic diagram of the combination of a gate circuit controlled by a reset and memory circuit arrangement.

Figure 2:
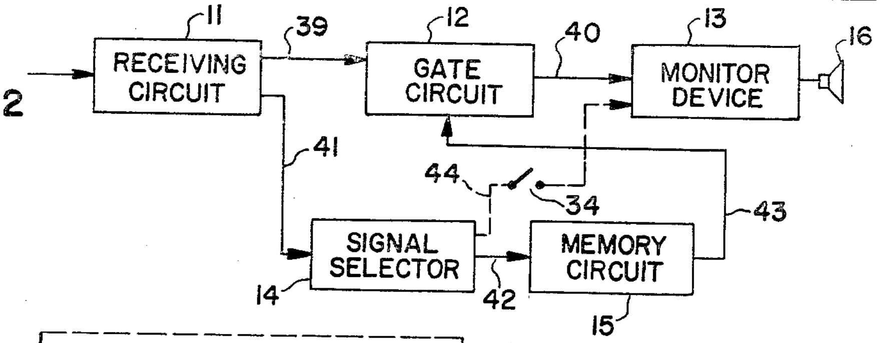
FIG. 2 is a block diagram of an illustrative embodiment of a receiver constructed in accordance with the principles of the invention.

Referring now to FIG. 2 which is a block diagram of the fundamental configuration of a receiver according to the invention, the output of a signal receiving stage 11 whereat the transmitted information is received is applied to a first signal selector 14 whose output is utilized as an input to a memory circuit stage 15. Signal selector 14 may suitably be a device such as a vibrating reed selector, a ceramic filter, a bandpass filter, a resonant circuit, a pulse code decoder, a device in which several of the foregoing elements are combined, and the like. In memory circuit 15, the output energy from signal selector 14 is stored and an output is developed therefrom which is applied as an input to a gate circuit 12 to control gate circuit 12 for a chosen period after the cessation of the input signal to circuit 12 from signal receiving stage 11. Suitable for use as memory circuit 15, i.e., a circuit from which an output is developed for a chosen period after the cessation of an input signal applied thereto, may be a capacitor charging or discharging circuit, a monostable multivibrator, a flip-flop circuit, or modifications of these circuits, and the like.

Gate circuit 12 is employed to transfer an output signal of receiving circuit stage 11 from its input to its output terminal during the time that there is applied thereto the control signal output from memory circuit 15. A circuit suitable for use as gate circuit 12 may be the well known so-called transmission gate or coincidence gate and may include transistors, vacuum tubes, diodes or relays as its functional and/or active devices.

A monitor device 13 to which the output of gate circuit 12 is applied may suitably comprise a low frequency network which includes a audio device such as a speaker 16 in its output.

Figure 1:
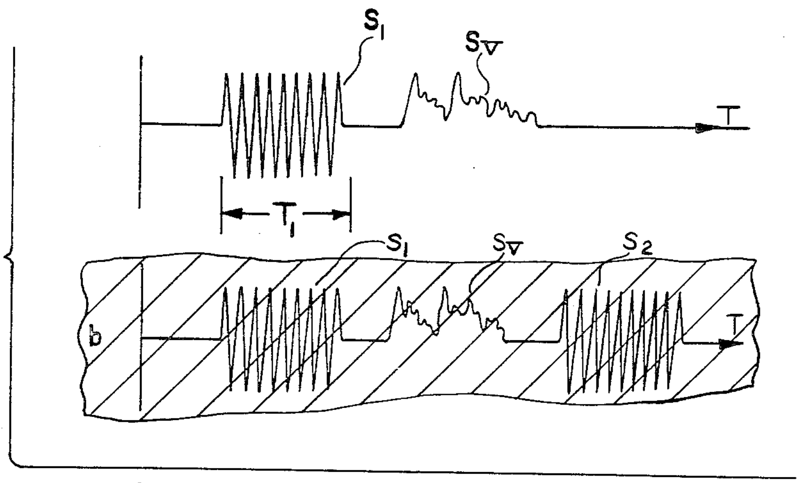

The waveform shown in FIG. 1 is an example of a calling signal combination transmitted to the receiver in the transceiver system. The waveform shows a chosen calling signal $S_1$, which is employed to drive the signal selector stage 14 contained in the receiver it is desired to transmit to, and is an example of the use of a single tone frequency as the calling signal. Immediately following the calling signal is a calling speech signal $S_v$, the latter signal being consistent with the designation of the intended receiver or its operator's name, for example, and being reproduced in audible form at the output of loudspeaker 16. Consequently, when a receiver such as that depicted in block form in FIG. 2 receives the signals shown in FIG. 1, signal selector 14 selects the first signal and in response to its application thereto produces an output which is applied as an input to memory circuit 15, the latter input energy being stored in memory circuit 15 and memory circuit 15 providing a control signal to gate circuit 12. Gate circuit 12 is rendered operative, i.e., enabled by the control signal from the memory circuit and, when so enabled, functions to transfer the output signal from receiving circuit 11 to monitor device 13. Thus, the calling tone signal will first be heard through loud speaker 16. Further, as described hereinabove, the output developed in memory circuit 15 continues for a given period after the cessation of the input signal applied thereto so that gate circuit 12 remains correspondingly operative or enabled for this given period. Consequently, if the calling speech signal $S_v$ is received directly after the calling tone signal, this speech signal $S_v$ will pass through gate circuit 12 and may thereby be heard through loud speaker 16. Receiving circuit 11 of course, may be a suitable amplifier of the transistor or vacuum tube type.

In the interests of simplicity of description and convenience in explanation of operation, the well known press-to-talk switch and other communication switches as well as the details of memory circuit 15 and gate circuit 12 are not included in FIG. 2 since such inclusion is not necessary to enable the understanding of the operation of the invention and since the constructions of such switches and circuits are well know to those skilled in the art.

Figure 3:
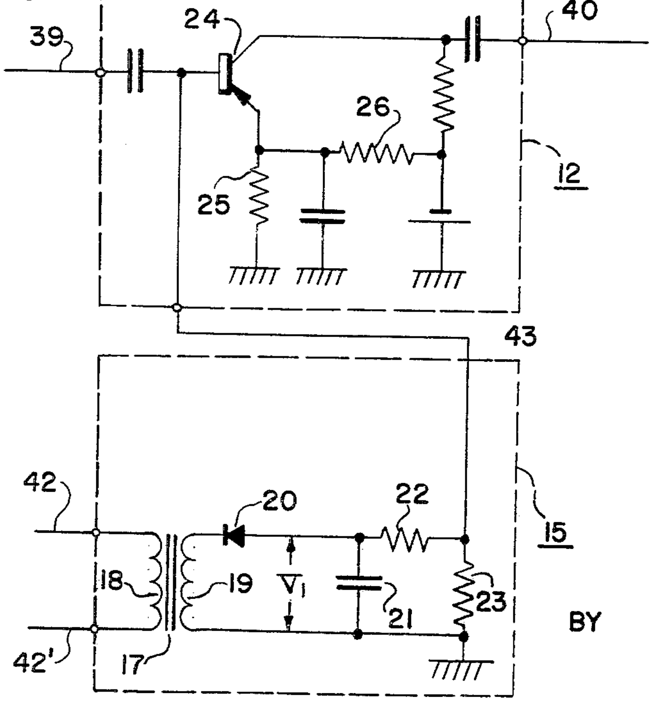
FIG. 3 is a schematic diagram of an example of a circuit suitable for use as the gate circuit and memory circuit stages in the receiver shown in block form in FIG. 2.

In FIG. 3 where there is shown an example of a circuit suitable for use as gate circuit 12, the output voltage from signal selector 14 is applied to the primary winding 18 of a transformer 17 through connecting lines 42 and 42'. The alternating current voltage produced across the secondary winding 19 of transformer 17 is rectified by a diode 20 to provide a direct current voltage $V_1$, across a capacitor 21, voltage $V_1$, being applied to the base of a transistor 24 to render transistor 24 conductive. A resistor 23 connected in parallel with the base of transistor 24 functions to provide a suitable base voltage. The series arrangement of a resistor 22 and resistor 23 connected in shunt with capacitor 21 serve as a discharge circuit therefor. Accordingly, with the selection of a discharge time constant of a suitable value for capacitor 21 and resistors 22 and 23, there is enabled the maintaining of conductivity in transistor 24 for a correspondingly suitable period after the cessation of the output from signal selector stage 14. In other words, memory circuit 15 functions to store the input energy applied thereto from signal selector 14 and to develop an output to control switching transistor 24 in gate circuit 12 for a chosen period after the cessation of the input signal thereto. Resistors 25 and 26 operate to insure that transistor 24 is at cutoff in its quiescent state by providing the necessary biasing voltage therefor at the base of transistor 24.

Figure 4:
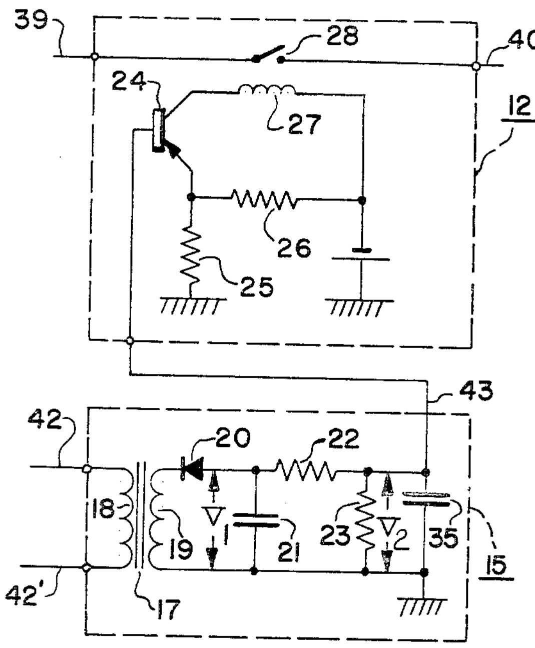
FIG. 4 is a schematic diagram of another example of a circuit suitable for use as the gate circuit and memory circuit stages in the receiver shown in block form in FIG. 2.

The circuit schematically depicted in FIG. 4 which is another example of a circuit suitable for use as gate circuit 12 in the receiver shown in FIG. 2 embodies the operating coil 27 of a relay, coil 27 being inserted into the collector circuit of transistor 24. With such arrangement, when transistor 24 conducts, its collector current flowing through relay coil 27 and thereby energizing it causes the normally open contact 28 associated with coil 27 to be placed into the closed position to permit the output signal of receiving circuit 11 to be supplied to monitor stage 13 through closed contact 28 and conductor 40. Otherwise, the structure and operation of the circuit shown in FIG. 4 corresponds to that of the circuit depicted in FIG. 3 and the same designating numerals have been used for like structures in both circuits respectively.

Figure 5:
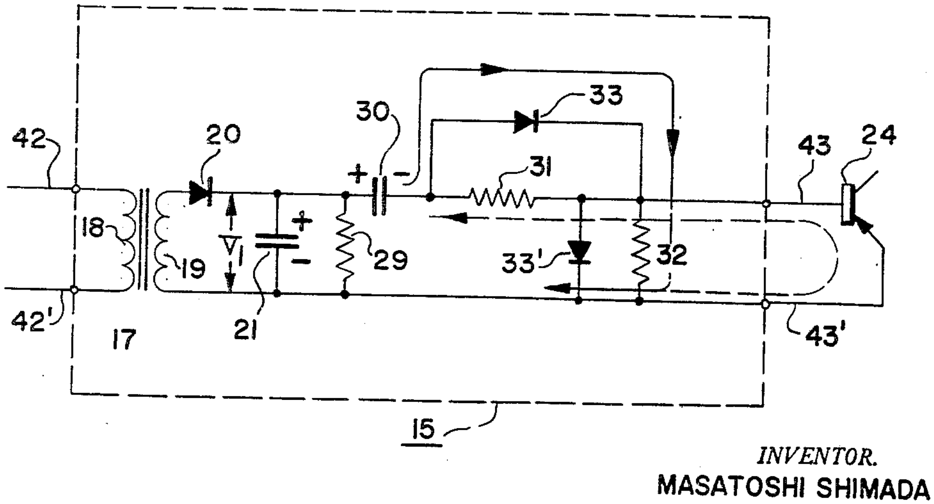
FIG. 5 is a schematic diagram of another example of a circuit suitable for use as the memory circuit.

FIG. 5 shows another example of a circuit suitable for use as memory circuit 15 in the receiver depicted in FIG. 2. In this circuit, the alternating current voltage produced across secondary winding 19 of transformer 17 is rectified by a diode 20 to produce the unidirectional voltage $V_1$ for charging a capacitor 21 in the polarity shown in the drawing and to provide a charge on a capacitor 30, in the polarity shown. However, the charging current does not flow through transistor 24 since it is of a polarity opposite to that necessary to render transistor 24 conductive. The respective values of capacitor 21 and a resistor 29 are so chosen whereby a relatively small time constant is attained and the respective values of capacitor 30 and the associated resistors 29, 31 and 32 are chosen whereby the time constant thereof is relatively large. Consequently, the charge on capacitor 21 decays quite rapidly after the cessation of the input signal on lines 42 and 42' but the charge on capacitor 30 continues to be discharged slowly thereafter. The discharge current from capacitor 30 flows through the base of transistor 24, as shown by the broken line, to render transistor 24 conductive. The diodes 33 and 33', poled as shown, operate to shorten the charging time of capacitor 30 because of their forward bias conductors.

It is thus seen that the circuit shown in FIG. 5, an output is not produced during the existence of the input signal but that an output is produced immediately upon the cessation of the input signal. If such circuit is employed in the receiver shown in FIG. 2, the calling signal will not be heard but only an ensuing calling speech signal will be heard through speaker 16 since the gate circuit 12 would not be enabled during the time that such calling signal is received. Consequently, if a disconnecting switch such as switch 34 is inserted between the output of signal selector 14 and the input to monitor device 13 as shown by the broken line in FIG. 2, the calling signal may be heard when switch 34 is in its closed position and will not be heard when switch 34 is in the open position. Hence, such arrangement is particularly advantageously employed in situations where the calling signal may be troublesome. It is of course, to be realized that circuits other than that shown in FIG. 5 may be used in place thereof to accomplish the same purpose, such other circuits being readily apparent to those skilled in the art, the circuit of FIG. 5 being one example.

The example of memory circuit 15 depicted in FIG. 5 may be considered a type of delay circuit and the employment of a circuit embodying such delay action is utilized in the receiver according to the invention, malfunction and improper operation occasioned by pulse shaped noise and like signals may be avoided. Such avoidance is enabled because, even if signal selector stage 14 were to produce an output in response to the receiving of such pulses, gate circuit 12 still would be rendered operative only after the elapsing of a predetermined time delay. Thus, if the latter time delay is chosen to have a value such that pulse shaped noise signals no longer exist when the gate circuit is enabled, such noises will, of course, not be heard through loud speaker 16. A capacitor 35 is provided in FIG. 4 as shown to delay the enabling of the gate circuit, i.e., the unidirectional voltage $V_2$ is produced on capacitor 35 after a brief time delay.

It is appreciated from the foregoing that the inclusion of a delay arrangement in signal selector 14, the same noise elimination result will be achieved.

Figure 6:
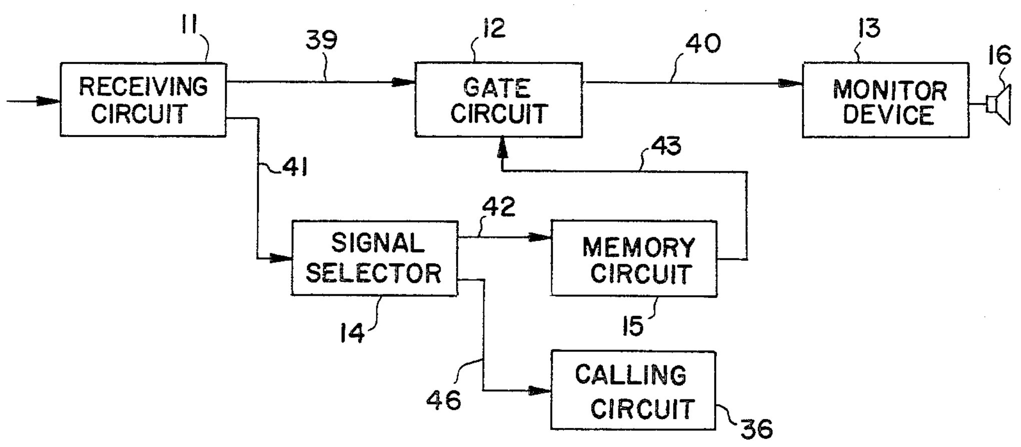
FIG. 6 is a block diagram of another embodiment of a receiver according to the invention.

When an unavailable frequency tone signal, a sequential tone signal, a signal composed of a plurality of different frequencies, a pulse code signal, or the like are employed as the specified calling signal, such signals are not suitable as calling tone signals. In these situations, it is necessary to include a further calling or annunciating device 36 as shown in the receiver depicted in FIG. 6 which otherwise is essentially similar to the receiver shown in FIG. 2. Device 36, which is controlled by the output of signal selector 14, may be a known device such as a buzzer, a lamp, a low frequency oscillator with an associated speaker, and the like. In addition, if the period of the calling signal is quite short, it is necessary to adopt a device 36 which has the necessary response characteristics to enable its employment for such short signal times. Since device 36 is well known in the art, a specific example thereof is not deemed necessary.

Figure 7:
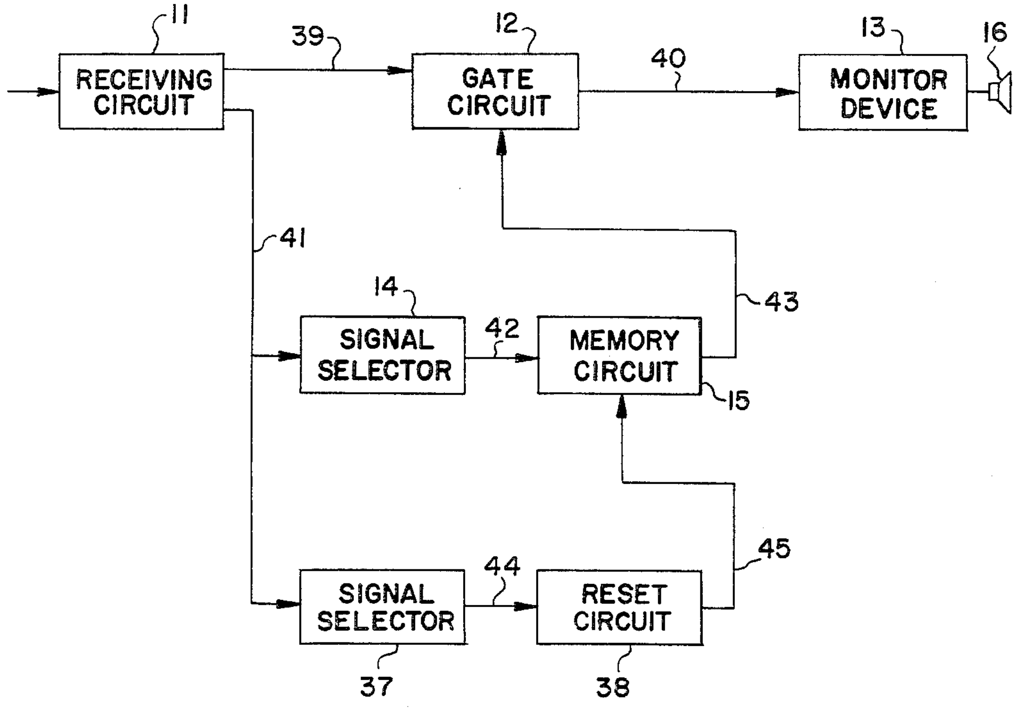
FIG. 7 is a block diagram of still another embodiment of a receiver constructed in accordance with the principles of the invention.

In a receiver employing a memory circuit comprising a charging or discharging capacitor 21 or 30, respectively, as shown in FIGS. 3 and 4, the operation of the gate circuit may persist for a relatively long time after the cessation of the calling signal. During this gate circuit operation time, it may happen that noise or cross-talk signals may be passed through the gate circuit. To avoid such occurrence, there is provided, according to the invention, the receiver depicted in block form in FIG. 7. The receiver shown in FIG. 7 is also essentially similar to the one shown in FIG. 2 with the difference that the receiver of FIG. 7 also includes a second signal selector stage 37 to which the output of the receiving stage 11 is applied, the output of stage 37 being applied to a reset circuit 38 whose output is applied to memory circuit 15. These stages, viz; selector 37 and reset circuit 38 function to halt the output from memory circuit 15 upon the cessation of the output from signal selector 37. Thus, if a second predetermined signal is transmitted during the calling time (tone and speech signal times) and its transmission is halted upon the cessation of the speech signal, gate circuit 12 of the receiver is restored to its closed or inoperative state as soon as the speech signal ends whereby noise and/or cross-talk signals are prevented from being passed through the gate circuit. Such second predetermined signal transmitted during the calling time period may, for convenience of designation, be referred to as a "holding" signal.

For reset circuit stage 38, there may suitably be utilized well known switching circuits which may comprise relays, transistors, diodes, electron discharge tubes or the like as the switching elements therein.

Figure 8:
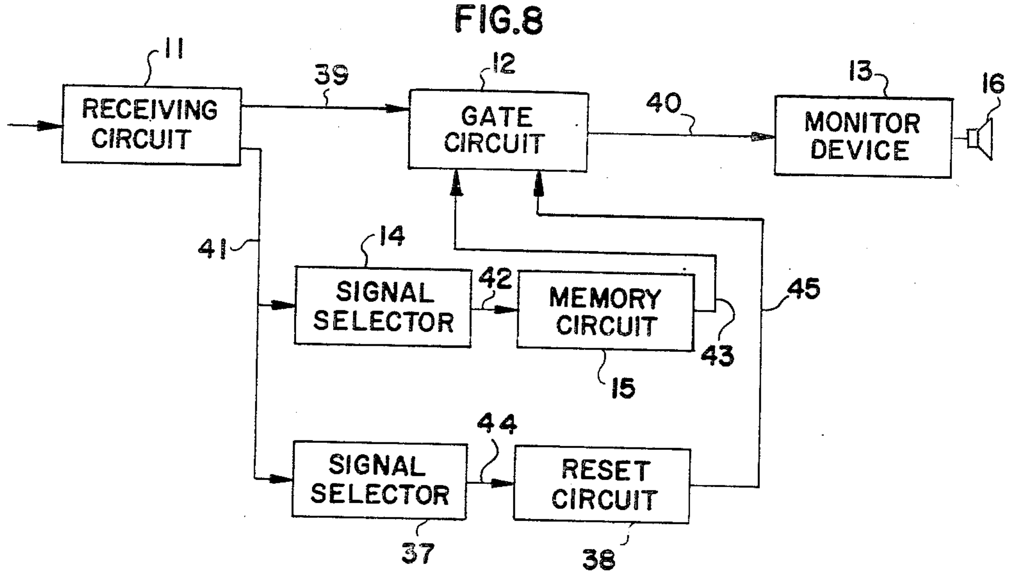
FIG. 8 is a block diagram of a receiver similar to that shown in block form in FIG. 7 and including a modification thereof.

The receiver depicted in FIG. 8 is essentially similar to that shown in FIG. 7 with the difference that the output of reset circuit 38 is employed to directly control gate circuit 12 rather than to control gate circuit 12 indirectly through memory circuit 15.

From the foregoing, it may be noted that the function of reset circuit 38 is to render gate circuit 12 enabled when the holding signal and the calling tone signal are both received and to restore the gate circuit to its closed state after a chosen period following the calling signal or immediately upon the cessation of the holding signal. Such reset function is provided since, where a charging or discharging circuit is used as in memory circuit 15, the ceasing of the production of an output from memory circuit 15 before the cessation of the holding signal rarely occurs.

If signal selector 37 or reset circuit 38 is provided with a delay arrangement such as described hereinabove in connection with the circuits shown in FIGS. 4 and 5, malfunctions caused by pulse shaped noise may be eliminated since the operation of gate circuit 12 is initiated after a brief delay time after the input signals are received.

Another advantage resulting from the use of reset circuit 38 is the ensuring of the proper operation, i.e., the enabling of gate circuit 12. Such ensuring can be readily understood by making reference to the curves shown in FIG. 9.

In FIG. 9, curve A represents a base current-time characteristic which may exist at the base of transistor 24 in the circuit of FIG. 3, for example, when reset circuit 38 is included and curve B represents such base current-time characteristic where no reset circuit is employed. Time $T_2$ represents a calling time period and $I_0$ is the minimum base current required to render transistor 24 conductive. Time $T_3$ represents the period necessary for discharging current B to attain the value $I_0$ and time $T_4$ represents an idle period in which transistor 24 remains conductive after the termination of the calling speech signal, i.e., the calling time. $I_m$ represents a desirable minimum value for operating current.

It is preferred that time $T_4$ be as short as possible. However where a discharge time constant is selected to have a small value in order to reduce time $T_4$, if such discharge time constant is chosen to have too small a value, the operation of transistor 24 may become unstable because the desirably minimum operating current value $I_m$ may fall to the value $I_0$. By contrast, it is desirable to make the calling time $T_2$ as long as possible because of the possible need for a long recognition signal. When a calling signal time $T_2$ is relatively short, time $T_4$ is commensurately increased under the same setting time $T_3$. However, if the production of an output from memory circuit 15 is halted at the end of the calling time by the operation of reset circuit 38, then the magnitude of the discharging time constant is no longer a factor to be concerned with relative to the transistors idle time operativeness and the base current-time characteristic may assume the form shown in curve A in FIG. 9. Consequently, with the use of reset circuit 38, there is made possible definitive control of transistor 24 by utilization of larger base current and its idle operative time can be held to a very small value.

The use of a holding signal in transceiver systems is known. However, in such known use, the holding signal has been transmitted together with the calling speech signal. Consequently, the frequencies of such holding signals have had to be limited to those which are less than 200 cycles since the latter frequency has generally represented the lowest frequency speech signal and interference with the speech signal has had to be avoided. As the selector component for such known holding signal, there has generally been employed a vibrating reed selector and a channel spacing of about 15 cycles has been provided to avoid any crossing between adjacent channels. Consequently, the number of channels equipped to be operated with holding signals has been limited to a small number such as about five to ten, if even that many.

However, according to the invention, the calling tone signal may have a frequency within the speech frequency range, i.e., 200 to 3000 cycles, since the tone signal is not transmitted together with the speech signal. Thus, for example, if the number of tone channels is 50 and the number of holding signals is 10, by combining pairs of different frequency signals and eliminating combinations of pairs of signals having the same frequency, there is made possible a much greater increase in the number of available calling channels, a possible number being 450 channels.

As the holding signal, there may be employed a carrier signal or a unidirectional current signal. FIGS. 10 and 11 are block diagrams of a receiver in accordance with the invention in which a carrier signal is utilized as the holding signal. In these receivers, the carrier signal obtained from receiving stage 11 is rectified to a unidirectional voltage which is utilized to control reset circuit 38. With such arrangement, if the transmission is halted immediately upon the completion of a calling, the holding carrier signal voltage and consequently the unidirectional voltage derived therefrom will terminate to restore gate circuit 12 to its inoperative or closed state whereby noise and cross-talk signals are entirely cut out. Such arrangement for controlling reset circuit 38 by the carrier signal functions to reduce malfunction caused by noise, i.e., if a noise output is produced from signal selector 14, the absence of a holding carrier signal at such time prevents the control of reset circuit 38. Consequently, gate circuit 12 is not enabled. Also, should reset circuit 38 be rendered operative by noise signals, such operativeness will be limited to a very short period.

As already described hereinabove, if a delay circuit is included in memory circuit 15, malfunctioning caused by noise and the like is completely eliminated.

In a frequency modulation system, a voltage limiter is usually included. Consequently, discrimination between carrier and noise outputs is not made. In such systems, it is unsuitable to utilize the carrier signal voltage to control reset circuit 38. However, in a frequency modulation receiver, a low frequency noise output will abruptly increase upon the termination of the carrier signal. Therefore, reset circuit 38 can be controlled by such noise voltage. In this connection, in the receivers shown in FIGS. 7 and 8 respectively, a narrow band pass filter may be employed as the signal selector stage 37 therein, such filter being chosen to selectively permit the passage therethrough of noise frequency components outside the calling tone and calling speech signal frequencies. Then, if transmission is halted immediately upon the completion of a calling, at this time receiving stage 11 produces a noise output which is properly band-pass filtered in signal selector stage 37 to operate reset circuit 38 which, in turn, returns gate circuit 12 to its inoperative or closed state.

In an intercommunication system in which a transmitter and a receiver are connected by wires, a unidirectional current holding signal is made available by sending it directly to the receiver and then terminating it at the completion of the calling. Such arrangement is shown in the receivers depicted in FIGS. 10 and 11.

From the above, it is realized that the reset circuit according to the invention has two types of functions, viz, enabling of a gate circuit with a holding signal and the returning of an operative gate circuit to its original inoperative state with a control signal.

In FIG. 12, there is shown an embodiment of reset circuit 38 to control memory circuit 15 and suitable for use in the receivers depicted in FIGS. 7 and 10 respectively. In this circuit, the output of signal selector 37 (FIG. 7) of a carrier voltage output from receiving stage 11 (FIG. 10) is applied to reset circuit 38 through input lines 44 and 44'. In FIG. 12, it is seen that the voltage applied to reset circuit 38 is of the unidirectional type which of course, indicates that the carrier voltage or the output of selector 37 is first rectified by suitable rectifying means, not shown. The unidirectional signal is applied to reset circuit 38 in a polarity to reverse bias a transistor 47.

A forward biasing voltage is applied to the base of transistor 47 through a resistor 49 from a negative potential source 50. However, the values of the input voltage to reset circuit 38 and the voltage from source 50 are chosen such that the input holding voltage overcomes the forward biasing voltage to maintain transistor 47 at cutoff during the time that the holding signal exists. When the holding signal terminates, transistor 47 is rendered conductive by the forward biasing voltage from source 50 whereby capacitor 21 may be discharged rapidly through conductive transistor 47 and whereby any output voltage on line 43 may correspondingly rapidly decay. Consequently, as described in connection with the circuit shown in FIG. 3, gate circuit 12 is restored to its original or inoperative state.

If reset circuit 38 includes a delay circuit such as one comprising a series connected resistor 51 and a shunt connected capacitor 52 as shown in FIG. 12, transistor 47 is only rendered cutoff after a short delay time if signal selector 14 produces a pulse shaped noise output. Thus, the supplying of the latter output to monitor device 13 is prevented because gate circuit 12 is only enabled after a delay period during which period the noise output terminates.

In FIG. 13 wherein there is schematically depicted a reset circuit 38 in combination with a memory circuit 15 which includes an electric relay, the output of signal selector 14 is applied to primary winding 18 of transformer 17 through lines 42 and 42' and the alternating current voltage appearing on secondary winding 19 is applied to the base of transistor 24. A unidirectional holding voltage with a polarity opposite to the applied holding voltage shown in FIG. 12 is fed to the base of transistor 47 through lines 44 and 44'. In the arrangement shown in FIG. 13, transistor 47 is conductive during the period of the holding voltage. The ripple current which flows in the collector of transistor 24 is smoothed by a capacitor 51 and such smoothed voltage is applied to the operating coil 27 of a relay to energize it and to consequently cause the closing of a normally open contact 28 associated with relay coil 27 whereby the output line 39 of receiving circuit 11 and the input line 40 to monitor device 13 are connected to each other. Simultaneously, a normally open contact 52 also associated with relay coil 27, is also closed upon the energization of coil 27 and through which relay current flows upon the termination of the input signal to transistor 24.

When the holding signal applied to reset circuit 38 terminates, transistor 47 is rendered nonconductive and current flow through relay coil 27 is halted to deenergize coil 27 and to cause contacts 28 and 52 to revert back to their normally open states. At this point the system is restored to its inoperative state.

It is apparent the memory circuit shown in FIG. 13 is different from the one shown in FIG. 21 which has a discharging capacitor 21. The memory circuit shown in FIGURE 13 may suitably be termed a "self-holding" circuit. Relay stage 27 may also embody an election discharge tube, a transistor, a switching circuit such as a multivibrator, and the like.

In FIG. 14, there is shown a system in which a gate circuit 12 is controlled by a reset circuit 38 and which is suitable for use in the receivers shown in FIGS. 8 and 11 respectively. In this system, a transistor 53 of gate circuit 12 is rendered conductive by an output from memory circuit 15 and amplifying transistor 24 is then rendered operative to pass through the output produced by receiving circuit 11. When a unidirectional holding signal with a negative polarity is applied to the base of transistor 47 through line 44, transistor 47 is rendered conductive to consequently render conductive a transistor 54 whereby the output on line 39 will be transferred in amplified form to line 40.

When the holding signal on line 44 terminates, transistor 47 is rendered nonconductive to disable the gate circuit. The resistors 25, 26, 55, 56 and 57 are respectively associated transistors 53 and 47.

In a receiver in a frequency modulation system, a circuit may be so arranged whereby a unidirectional voltage on line 44 renders conductive transistor 47 in the circuit of FIG. 12, and renders nonconductive transistor 47 in the circuits of FIGS. 13 and 14 respectively. With such arrangement, the objects of the circuits of FIGS. 12, 13 and 14 are achieved in a frequency modulation system.

While there have been described what are considered to be preferred embodiments of this invention, it will be obvious to those skilled in the art that various changes may be made therein without departing from the invention and it is, therefore, intended in the appended claims, to cover all such modifications as fall within the spirit and scope of the invention.

What is claimed as new and desired to be secured by Letters Patent of the United States is:

1. A receiving means for receiving signals transmitted thereto.

first means in circuit with said receiving means for selecting a first predetermined signal from said received signals, a memory circuit which produces an output in response to the application thereto of said first selected predetermined signal, monitor means responsive to the application thereto of said received signal, gate circuit means including relay means which is energized by the application of said memory circuit output to said gate circuit means and a normally open contact associated with said relay means and interposed between the output of said receiving means and the input to said monitor means, said contact assuming the closed state in response to the energization of said relay means, and reset circuit means which is controlled by a holding signal received by and produced from said receiving means for a period which is longer than said first selected signal, said gate circuit means being enabled in response to the actuation of said reset circuit and being rendered disabled by the termination of said holding signal.

2. A receiving means for receiving signals transmitted thereto, first means in circuit with said receiving means for selecting a first predetermined signal from said received signals, a memory circuit which produces an output in response to the application thereto of said first selected predetermined signal, a gate circuit means in circuit with said receiving means and said memory circuit which is enabled in response to the application thereto of said memory circuit output to pass through said gate circuit means, signals received by said receiving means, and a reset circuit means which is actuated by a holding signal received by and produced from said receiving means for a period which is longer by a chosen amount than said first selected signals, said gate circuit means being enabled in response to the actuation of said reset circuit and being rendered disabled by the termination of the actuation of said reset means.

3. A receiver as defined in claim 2 wherein there is included a second means in circuit with said receiving means for selecting said holding signal from the output of said receiving means and for applying said holding signal to said reset circuit means.

4. A receiving means for receiving signals transmitted thereto, first means in circuit with said receiving means for selecting a first predetermined signal from said received signals, a memory circuit which produces an output in response to application thereto of said first selected predetermined signal, a gate circuit means in circuit with said receiving means and said memory circuit which is enabled in response to the application thereto of said memory circuit output to pass through said gate circuit means, signals received by said receiving means, and a reset circuit means which is actuated by a holding signal received by and produced from said receiving means for a period of which is longer by a chosen amount than said first selected signal, said memory circuit being actuated in response to the actuation of said reset circuit to enable said gate circuit means during the actuation of said memory circuit.

5. A receiver as defined in claim 4 wherein said first selected signal is a frequency modulated signal, wherein said second means is a noise frequency selective detector for producing a unidirectional noise voltage, said last named voltage being applied as said holding signals to said reset circuit means.

6. Receiving means for receiving signals transmitted thereto;

first means in circuit with said receiving means for selecting a first predetermined signal from said received signals;

a memory circuit which produces an output in response to the application thereto of said first selected predetermined signal and continues said output for a given period after the termination of said selected predetermined signal, said memory circuit including means for delaying the production of an output from said memory circuit;

a monitor means responsive to the application thereto of said received signals; and gate circuit means connected between said receiving means and said monitor means which is enabled in response to the application thereto of said memory circuit output to pass through said gate circuit means, signals received by said receiving means whereby said gate circuit means remains correspondingly enabled for said given period.

7. Receiving means for receiving signals transmitted thereto;

first means in circuit with said receiving means for selecting a first predetermined signal from said received signals;

a memory circuit which produces an output in response to the application thereto of said first selected predetermined signal and continues said output for a given period after the termination of said selected predetermined signal, said memory circuit including means for delaying the production of an output from said memory circuit;

a monitor means responsive to the application thereto of said received signals;

gate circuit means connected between said receiving means and said monitor means which is enabled in response to the application thereto of said memory circuit output to pass through said gate circuit means, signals received by said receiving means whereby said gate circuit means remains correspondingly enabled for said given period; and means for delaying the production of a output from said memory circuit until said first selected signal has substantially terminated, whereby no calling signal is heard through said monitoring means and the following speech signal is heard for said given period wherein after said period the memory circuit and the gate circuit are restored to their initial state.

8. A receiver as defined in claim 7 further including switching means for selectively applying the output of said first selecting means directly to said monitor means.

9. A receiver as defined in claim 7 further including an annunciating device responsive to the application thereto of said first selected signal.

10. Receiving means for receiving signals transmitted thereto;

first means in circuit with said receiving means for selecting a first predetermined signal from said received signals;

a memory circuit which produces an output in response to the application thereto of said first selected predetermined signal and continues said output for a given period after the termination of said selected predetermined signal;

a monitor means responsive to the application thereto of said received signals;

gate circuit means connected between said receiving means and said monitor means which is enabled in response to the application thereto of said memory circuit output to pass through said gate circuit means, signals received by said receiving means whereby said gate circuit means remains correspondingly enabled for said given period; and reset circuit means which is controlled by a holding signal received by and produced from said receiving means for a period which is longer than said first selected signal, said gate circuit means being enabled in response to the actuation of said reset circuit and being rendered disabled by the termination of said holding signal.

a reset circuit means which is actuated by a holding signal received by and produced from said receiving means for a period which is longer by a chosen amount than said first selected signal, said memory circuit being actuated in response to the actuation of said reset circuit to enable said gate circuit means during the actuation of said memory circuit.

11. A receiver as defined in claim 10, wherein said holding signal is a carrier signal transmitted thereto.

References Cited

UNITED STATES PATENTS 3,138,755 6/1964 Kompelien __________ 325—55

KATHLEEN H. CLAFFY, Primary Examiner

B. P. SMITH, Assistant Examiner